(12) United States Patent
Costin et al.

(10) Patent No.: US 6,315,202 B2
(45) Date of Patent: *Nov. 13, 2001

(54) MATERIAL CODING USING LASERS

(75) Inventors: Darryl J. Costin, Perrysburg, OH (US); Carl J. Hildebrand, Jr., Royal Oak, MI (US)

(73) Assignee: Technolines, LLC., Perrysburg, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/907,932

(22) Filed: Aug. 11, 1997

(51) Int. Cl.$^7$ ........................................ G06K 7/10
(52) U.S. Cl. ........................ 235/462.09; 235/462.11; 430/292
(58) Field of Search ........................ 8/444, 115.52, 8/115.53; 235/375, 378, 380, 382, 462, 462.11, 462.04, 469, 462.09; 430/945, 292, 346

(56) References Cited

U.S. PATENT DOCUMENTS

| | | | | |
|---|---|---|---|---|
| 3,920,124 | * | 11/1975 | Patterson | 235/462.01 |
| 4,766,301 | * | 8/1988 | Evers | 235/487 |
| 4,861,620 | * | 8/1989 | Azuma et al. | 427/53.1 |
| 5,171,650 | * | 12/1992 | Ellis et al. | 430/945 |
| 5,175,774 | * | 12/1992 | Truax et al. | 382/8 |
| 5,206,492 | * | 4/1993 | Clement et al. | 250/271 |
| 5,247,154 | * | 9/1993 | Ahmed | 235/462.09 |
| 5,567,207 | * | 10/1996 | Lockman et al. | 8/444 |
| 5,585,616 | * | 12/1996 | Roxby et al. | 235/454 |
| 5,742,036 | * | 4/1998 | Schramm, Jr. et al. | 235/449 |
| 5,854,148 | * | 12/1998 | Asada et al. | 442/203 |
| 5,895,073 | * | 4/1999 | Moore | 283/70 |
| 5,990,444 | * | 11/1999 | Costin | 219/121.69 |

FOREIGN PATENT DOCUMENTS

63216790 * 3/1997 (JP) ........................... 235/469

* cited by examiner

*Primary Examiner*—Michael G. Lee
*Assistant Examiner*—Daniel St. Cyr
(74) *Attorney, Agent, or Firm*—Scott C. Harris, Esq.

(57) ABSTRACT

A laser marking system encodes a code on an article, eg an article of clothing. The code is detected by a camera or other imaging system that does not require reflectivity for its proper operation.

20 Claims, 2 Drawing Sheets

MATERIAL CODING USING LASERS

BACKGROUND OF THE INVENTION

The present invention relates to a system of coding materials using a laser.

Automatic article identification has a number of advantages. For example, certain articles of clothing have unique value based on their brand name. Two substantially identical clothing items may have very different values based on the name. Moreover, the relative costs of such articles may be more pronounced in some markets than others. This is led to a practice whereby manyt manufacturers sell materials for use in only one country.

An item made by a company for use in one country which is sold in another country is often called grey-market. Because of the different pricing structures in place, there is an enormous possibility for profits when this is done.

Even more profitable, moreover, is the possibility of outright counterfeiting. Counterfeit articles can be very cheaply made, and often difficult to detect. The counterfeit articles cause signficant problems. Their quality cannot be controlled, and may weaken the public's confidence in the product. They also can represent significant lost profits to the actual authorized manfacturer.

Various techniques of product marking are known.

SUMMARY OF THE INVENTION

In consideration of the above, the present invention describes a system of marking identification codes on specific materials. The identification codes are preferably encoded using an encryption system such as a digital signature which makes it effectively impossible to counterfeit the information. Moreover, any attempt to alter the signature can be readily detected. The codes can also be automatically read, and used to detect various information about the material being marked.

Different codes are described in these applications. These different codes are usable in different applications.

BRIEF DESCRIPTION OF THE DRAWINGS

These and other aspects of the invention will now be described with reference to the attached drawings, in which.

DESCRIPTION OF THE PREFERRED EMBODIMENTS

The present system can be used with any material which is susceptible for writing by a focused beam of radiation, such as that produced by a laser. The laser writing is carried out according to the techniques described in either of our copending applications (LMI) (LMII) or using the techniques described in U.S. Pat. No. 5,567,207, the disclosure of which is herewith incorporated by reference.

This system can be used to scribe any kind of graphical based code on any item or any material. This includes any material described in any of those patents, most specifically, articles of clothing, apparel goods, leathers and fabrics. For purposes of explanation, the preferred embodiment will be described relative to scribing coding patterns on denim material jeans. It should be understood that any article, including shoes, dresses, other clothing, rolls of raw material, building products, or other materials, could similarly be scribed in such a way. The material is preferably changed by controlling the energy density per unit time that is applied by the laser, in order to alter the material without undesireably damaging the material.

The inventors' goal included scribing a code on a pair of denim jeans. They first postulated scribing conventional bar codes. The bar code could be scribed using the laser. However, the techniques of scribing materials that are described above usually change the look of the material, either by controlled burns of the material or by fading the dye of the material. The convention bar code reader could not read this bar code. The inventors also recognized that linear bar codes were limited in the amount of information that could be presented. A linear bar code is typically limited to 15 bytes or approximately 22 characters of information. In view of this recognition, the inventors determined an alternate system.

The inventors describe a system herein that allows reading of such a graphical information code when imprinted on the material as described above. Such a pattern will have relatively reduced reflectivity.

Figure 1:
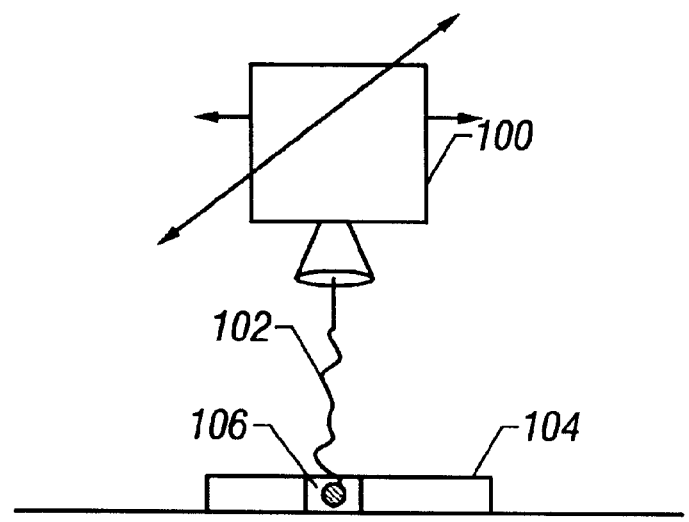
FIG. 1 shows a laser marking system.

FIG. 1 shows the basic layout of the laser scribing apparatus which is used according to the present invention. A controllable movable laser 100 produces a laser beam 102 which is used to scribe a pair of denim jeans 104. Using techniques which are described in the above discussed patents and application, any desired pattern can be formed on jeans 104 based on the programming of the controller for laser 100.

Figure 2:
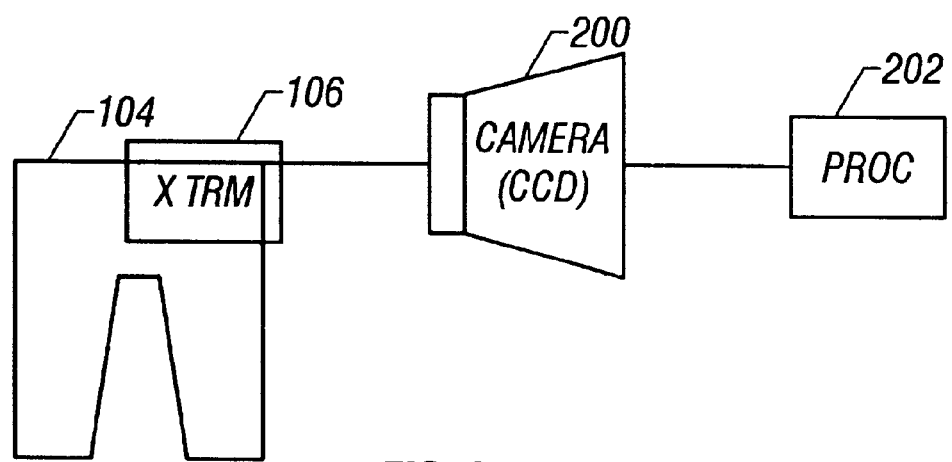
FIG. 2 shows a camera capturing system for the information.

The jeans 104 with the pattern scribed thereon is shown in FIG. 2. The pattern 106 is shown as being formed of alphanumeric characters, here "XTRM". These characters represent an encrypted message, encrypted preferably using 128 bit Data Encryption Standard ("DES"), or any other secure encryption system.

A reading system is used which does not require reflectivity to read the information. Specifically, a CCD camera 200 is used to acquire an image of the area of the jeans 104 including the marking 106. The output of the CCD camera is an image. The image is processed using machine vision or recognition techniques to recognize the contents of the image. This is preferably done by identifying objects within the image, and comparing each of these objects to a known image, also called a "kernel". The objects are correlated against the all the possible kernels. A distance between each object and each kernel is calculated. The smallest distance, if within a specified range, represents the match.

Figure 3:
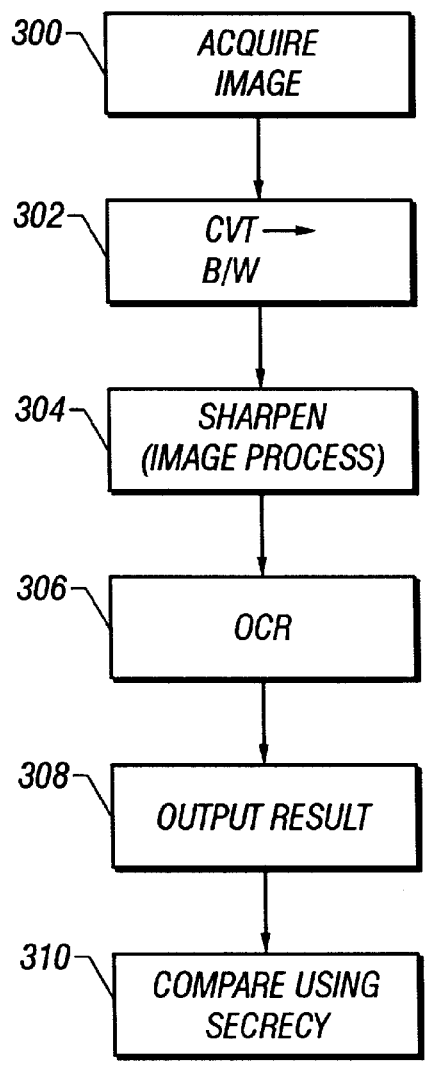
FIG. 3 shows a flowchart of operation.

A specialized form of machine vision called optical character recognition is used to recognize the alphanumeric characters. This is done in image processing computer 202. The system operates according to the flowchart of FIG. 3. At step 300, the camera acquires the image. Step 302 defines converting the image to a two-colored image, e.g., a black and white image. In the case of denim, the laser marking typically fades the dye of the denim at the places where it marks. Therefore, the image is pixilated, and each pixel of the image is compared to a color reference. If the color is sufficiently indigo to represent a non-faded element, then that pixel of the image is taken as black. If the pixel is sufficiently faded, e.g. within 30% of white, then the pixel is taken as being a white pixel. This converts the image to a two-colored image representing the acquired information.

Figure 4:
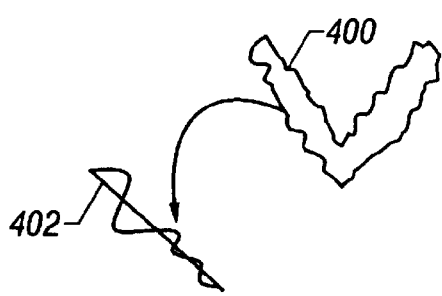
FIG. 4 shows an edge straightening operation.

The edges of the acquired information will likely not be very sharp, since the color of many of the pixels at the edges may be ambiguous. Step 304 represents an image processing step, therefore, to clean up the image. One of the image processing steps is a sharpening step in which edge lines are straightened to form sharp edges on the lines. An example of an edge sharpening operation is shown in FIG. 4. Element 400 represents the acquired image. The image includes wavy lines representing the edges of the image. Each wavy line is converted into a straight line 402 at an integrated midpoint of the wavy line image. Other similar image processing operations are also known.

In this embodiment, where the information is printed in readable characters, the recognition step is simply an optical character recognition step 306 using commercially available software. This outputs the textual information at 308 in a well known format. This textual information is then decrypted, checked for authenticity, and compared with information in a database. For example, the code may be a unique serial number, or may just be a brand name. It may indicate other information, including date of manufacture, place of manufacture, and other unique information. If the article is being sold in location x, that location is compared with the database's information about the product. This can be used to detect forgeries, grey market goods, or for inventory control.

An important part of this system is the use of encryption techniques in order to avoid counterfeiting which could otherwise fool the system. A particular preferred encryption technique is the use of a digital signature cryptography system. This allows the maker of the material to digitally sign the code. The digitally signed code is then applied to the denim in order to indicate unique characteristics of the denim such as a unique serial number.

Any user other than the authorized user will not know the encryption code and therefore will not be able to produce a valid digital signature. This allows attempted forgeries to be easily determined.

The above embodiment has described optical character recognition of characters which are imprinted on the denim material. However, the system can also use specially-encoded patterns which are compared with stored patterns. Systems are also known which store additional information within an existing pattern, e.g., within an image. One such program is "S-tools" for Windows. The information is stored by modifying portions of the image to represent the information. The information can then be retrieved from viewing the image. This system can therefore store the information by modulating portions of the image, e.g. a company logo, or an image of the company name. This system allows the information to be stored on the garment without leaving a visible mark.

Figure 5:
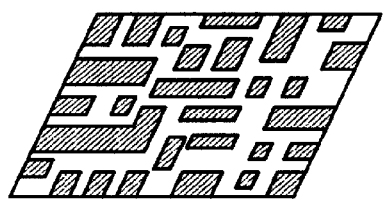
FIG. 5 shows an example a matrix code.

A particularly preferred embodiment uses a relatively new form of coding known as a matrix code. The two dimensional matrix coding allows a large amount of information to be presented on the garment. A depiction of a matrix code is shown in FIG. 5. This matrix code is also explained in the document "2D Symbology A New Dimension for Automatic Identification" available from Acuity imaging. Three kinds of codes, called DATA MATRIX (tm), PDF417, and MAXI CODE (TM), are examples of such matrix codes. Matrix codes and coders are also availible from Acuity Imaging.

A 2D matrix code is preferably scribed with a power between 0.1 and 100 watts at a speed of 0.1 to 60 inches per second and a spot size of 0.0025 to 0.008 inches. These different parameters effect the speed and quality of the resultant image change.

2D matrix codes can be used to encode industry standard characters or custom characters. Each character is assigned to have a meaning, e.g. a brand name and or location of manufacture. This can allow the system to be used as an effective counterfeit prevention tool. The system uses places a pattern reader at retail outlet. The pattern reader can be programed to recognize the appropriate trademark symbol and to use a decryption key system to decrypt the encrypted information and compare the information with information that indicates valid information.

Other embodiments are within the disclosed system.

What is claimed is:

1. A method of laser marking, coding, and decoding, comprising:

using a laser to mark information on an article, said article being an article of clothing, leather or fabric, which information represents some characteristic of the article, said information being marked by using the laser to change the material in a way that changes the physical appearance of the article;

imaging the information from the article; and decoding the imaged information to determine the characteristic of the article.

2. A method as in claim 1, wherein said characteristic is a serial number.

3. A method as in claim 1, wherein said laser is used to mark the material at a specified energy density per unit time that does not undesireably damage the material.

4. A method as in claim 1, wherein said information is a 2D matrix code.

5. A method as in claim 1, wherein said change of the physical appearance of the article comprises changing a color of the material.

6. A method of marking a code on a garment, comprising:

obtaining a code to be marked on the garment; and using a laser to change a material of the garment in a way that selectively changes physical appearances of different portions of the material in a way that represents the code.

7. A method as in claim 6, wherein said code is one of a matrix code, a bar code, or an alphanumeric code.

8. A method as in claim 6, wherein said obtaining comprises:

obtaining information about the garment; and digitally encrypting said information to form code information.

9. A method as in claim 6, wherein said using comprises controlling an output of said laser to have an energy density per unit time that fades a color of the garment at desired modified locations, without undesirably burning or punching through said garment.

10. A method as in claim 6, wherein said code identifies a geographic region of sale of said garment.

11. A method of reading a code from a garment, comprising:

using an image acquisition device to obtain an image of a portion of the garment;

comparing said portion with specified image references, to determine non-altered portions of the garment whose appearance has not been altered, and altered portions of the garment whose appearance has been altered; and extracting a code from the pattern of altered and nonaltered portions.

12. A method as in claim 11, further comprising extracting information from within said code, said information being specific to the garment being imaged.

13. A method as in claim 11, further comprising decrypting information in said code.

14. A method as in claim 11, wherein said code is formed directly on the material that forms the garment.

15. A method as in claim 11, wherein said image references are colors, and said comparing determines said altered portions by determining portions of said garment that have been faded.

16. A method of detecting whether a garment is authentic, comprising:

reading a code from the garment which includes encrypted authentication information;

decrypting the authentication information; and using the decrypted authentication information to determine if the garment is authentic.

17. A method as in claim 16, further comprising, prior to said reading, marking the code on to the garment by using a laser to mark said garment without undesireably damaging a material of said garment.

18. A method as in claim 17, wherein said marking comprises using said laser to fade a color of selected portions of said garment.

19. A method as in claim 16, wherein said reading comprises reading a code that is directly imprinted on material that forms the garment.

20. A method as in claim 16, wherein said using comprises comparing the authentication information to information in a database that includes information on authentic garments.

* * * * *